(12) United States Patent
Sutiawan et al.

(10) Patent No.: US 10,963,186 B2
(45) Date of Patent: Mar. 30, 2021

(54) LATENT MULTIPLICITY DETECTION

(71) Applicant: Seagate Technology LLC, Cupertino, CA (US)

(72) Inventors: Andi Sumaryo Sutiawan, Singapore (SG); Brandon Mun Hon Yuen, Singapore (SG); Xu Huang, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 16/360,948

(22) Filed: Mar. 21, 2019

(65) Prior Publication Data

US 2019/0294375 A1 Sep. 26, 2019

Related U.S. Application Data

(60) Provisional application No. 62/646,769, filed on Mar. 22, 2018.

(51) Int. Cl.
*G06F 12/00* (2006.01)
*G06F 3/06* (2006.01)
*G06F 12/0891* (2016.01)

(52) U.S. Cl.
CPC .......... *G06F 3/0659* (2013.01); *G06F 3/0619* (2013.01); *G06F 3/0689* (2013.01); *G06F 12/0891* (2013.01)

(58) Field of Classification Search
CPC .... G06F 3/0659; G06F 3/0619; G06F 3/0689; G06F 12/0891
See application file for complete search history.

(56) References Cited

U.S. PATENT DOCUMENTS

| | | | |
|---|---|---|---|
| 4,837,678 A * | 6/1989 | Culler | G06F 9/223 |
| | | | 712/204 |
| 8,266,501 B2 | 9/2012 | Jeddeloh | |
| 9,335,939 B2 | 5/2016 | Bennett et al. | |
| 9,632,870 B2 | 4/2017 | Bennett | |
| 2008/0016330 A1* | 1/2008 | El-Essawy | G06F 12/0862 |
| | | | 712/225 |
| 2012/0147988 A1* | 6/2012 | Neeman | H03M 13/271 |
| | | | 375/295 |
| 2017/0078313 A1* | 3/2017 | Zhong | H04L 45/021 |
| 2017/0199670 A1 | 7/2017 | Bennett | |

* cited by examiner

*Primary Examiner* — Prasith Thammavong
(74) *Attorney, Agent, or Firm* — Holzer Patel Drennan

(57) ABSTRACT

Implementations disclosed herein provide a method of receiving a command from a host, the command providing a starting logical block address (LBA) and a length of the command, generating a multiplicity bit mask (MBM) for the command in response to receiving a command from a host, and storing the MBM to an MBM table in a row corresponding to a stream that the command is part of.

20 Claims, 9 Drawing Sheets

200

| | Last LBA | Multiplicity Bit Mask | | | | | | | | | | | | | | | | | | |
|---|---|---|---|---|---|---|---|---|---|---|---|---|---|---|---|---|---|---|---|---|
| | | 0 | 1 | 2 | 3 | 4 | 5 | 6 | 7 | 8 | 9 | 10 | 11 | ... | 24 | 25 | 26 | 27 | 28 | 29 ... m |
| 1 | INVALID LBA | 0 | 0 | 0 | 0 | 0 | 0 | 0 | 0 | 0 | 0 | 0 | 0 | ... | 0 | 0 | 0 | 0 | 0 | 0 ... 0 |
| 2 | INVALID LBA | 0 | 0 | 0 | 0 | 0 | 0 | 0 | 0 | 0 | 0 | 0 | 0 | ... | 0 | 0 | 0 | 0 | 0 | 0 ... 0 |
| 3 | INVALID LBA | 0 | 0 | 0 | 0 | 0 | 0 | 0 | 0 | 0 | 0 | 0 | 0 | ... | 0 | 0 | 0 | 0 | 0 | 0 ... 0 |
| 4 | INVALID LBA | 0 | 0 | 0 | 0 | 0 | 0 | 0 | 0 | 0 | 0 | 0 | 0 | ... | 0 | 0 | 0 | 0 | 0 | 0 ... 0 |
| 5 | INVALID LBA | 0 | 0 | 0 | 0 | 0 | 0 | 0 | 0 | 0 | 0 | 0 | 0 | ... | 0 | 0 | 0 | 0 | 0 | 0 ... 0 |
| ... | ... | 0 | 0 | 0 | 0 | 0 | 0 | 0 | 0 | 0 | 0 | 0 | 0 | ... | 0 | 0 | 0 | 0 | 0 | 0 ... 0 |
| N | INVALID LBA | 0 | 0 | 0 | 0 | 0 | 0 | 0 | 0 | 0 | 0 | 0 | 0 | ... | 0 | 0 | 0 | 0 | 0 | 0 ... 0 |

LATENT MULTIPLICITY DETECTION

CROSS-REFERENCE TO RELATED APPLICATIONS

The present application is a non-provisional application of and claims priority from and benefit of U.S. Provisional Application Ser. No. 62/646,769 filed on Mar. 22, 2018, which is incorporated herein by reference in its entirety.

BACKGROUND

Storage disks are frequently used to store digital data. For example, a user may store digital photographs, digital songs, or digital videos on a computer disk drive that includes one or more storage disks. As digital content becomes increasingly popular, consumer demand for storage capacity may correspondingly increase.

SUMMARY

Implementations disclosed herein provide a method of receiving a command from a host, the command providing a starting logical block address (LBA) and a length of the command, generating a multiplicity bit mask (MBM) for the command in response to receiving a command from a host, and storing the MBM to an MBM table in a row corresponding to a stream that the command is part of.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification.

FIG. 2 illustrates a multiplicity bit mask (MBM) table initialized at step 1 of the method disclosed herein.

DETAILED DESCRIPTION

Figure 1:
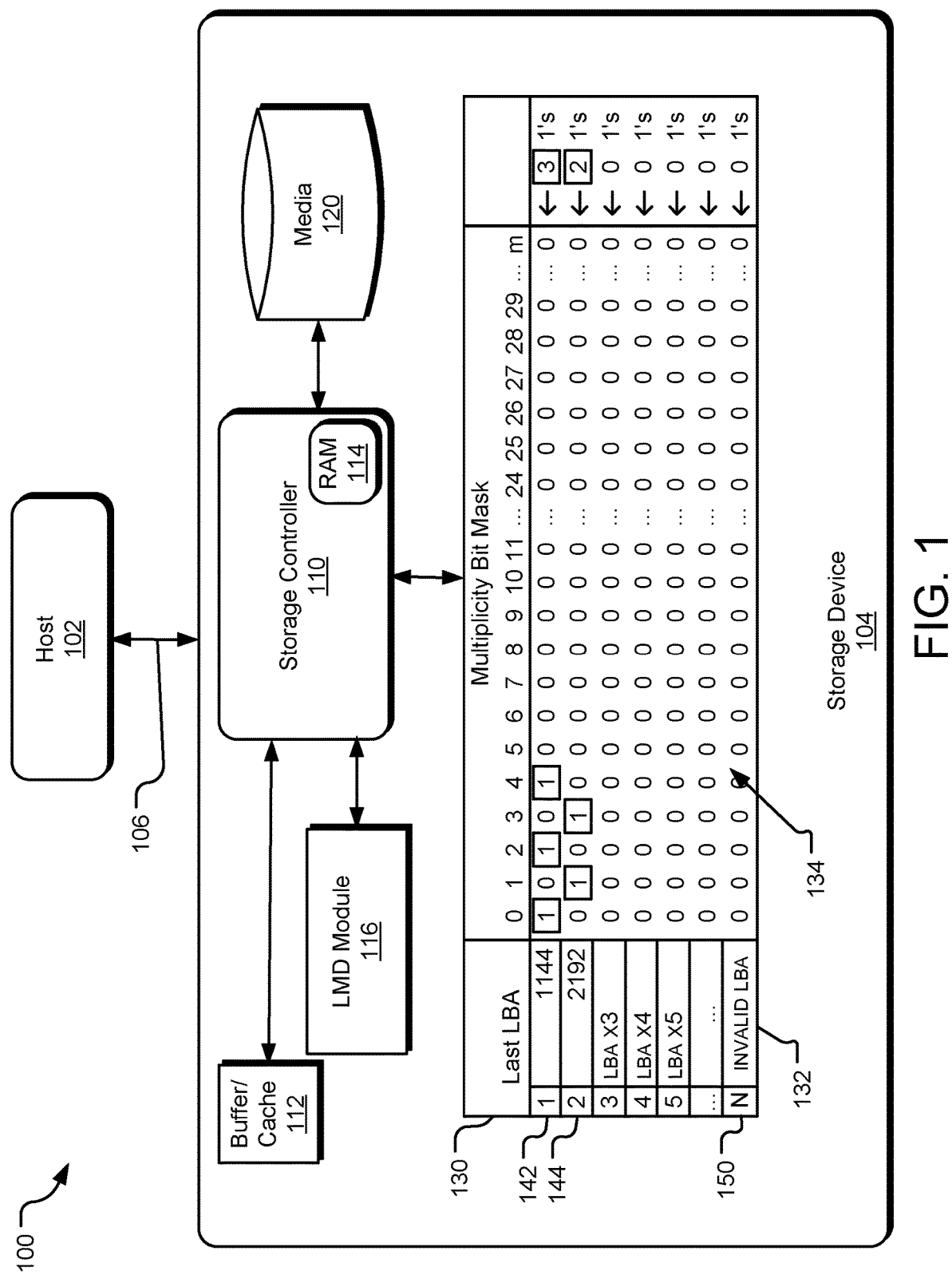
FIG. 1 illustrates an example storage system using the latent multiplicity detection method disclosed herein.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As digital content becomes increasingly popular, consumer demand for storage capacity may correspondingly increase. Specifically, more and more of the storage drives are used for storing surveillance data, video data, etc. where a large amount of streaming data is coming into the hard drives. Quite often the streaming data streams require random writes. On the other hand, a number of storage devices use technology such as shingled media recording (SMR), interlaced media recording (IMR), etc., that favor sequential writing. When the data arrives at the storage device, it is often difficult to determine the stream that the incoming data belongs to. For example, if a device has streaming data coming from ten different streams, wherein chunks of data from these different streams is interleaved, it may be difficult for the receiving device to determine the stream that a given chunk of data belongs to. Sometimes, the receiving device incorrectly determines whether a block of incoming data is streaming data or not.

For example, a drive storing streaming data for an online search company may send 64 different streams of data to that storage device, where each of the 32 streams may be of the size of one megabyte (MB). Given the large size of the aggregate data, in the order of 40-60 MB total data, the storage device may not be able to store and identify uniquely and be able to write efficiently to the drive due to limitations of the buffer size. In such case, the drive sometimes writes the data to temporary space until it is able to identify the stream that the given data belongs to. This results in performance penalty as well as inefficient usage of storage space. Furthermore, this problem is further exacerbated for drives that are write cache disabled or where buffer is not allowed.

The implementations disclosed herein are independent of the depth of queue of the incoming commands and independent of the size of the buffer available to the storage device. Furthermore, it is independent of the flush cache command as it does not use the content of the buffer itself.

The implementations of the latent multiplicity detection system disclosed herein may be applied to any type of storage devices, including conventional magnetic recording (CMR) devices, IMR storage devices, SMR storage devices, etc. Furthermore, it can be applied to streaming data, streaming data including metadata, etc.

FIG. 1 illustrates a storage system 100 using the latent multiplicity detection method disclosed herein. The storage system 100 includes a host 102 communicating with a storage device 104. The storage device 104 may be an IMR storage device, a CMR storage device, an SMR storage device, etc. The storage device 104 may communicate with the host 102 using a communication interface 106 that uses the SAS protocol, the SATA protocol, or other such protocol. The host 102 may send a large number of commands, including various commands for writing streaming data to the storage device 104.

In one implementation, the storage device 104 may include a storage controller 110 that manages the processing of the commands from the host 102. The storage controller 110 may be configured to communicate with storage media 120 that is configured to store the data related to the commands from the host 102. The storage controller 110 may also communicate with a buffer or a cache 112. Note that the cache 112 may be external to the storage media 120 or it may be configured on the storage media 120. The storage controller 110 may also have random access memory (RAM) that may be used to store various information that can be used to control the storage device 104.

In the illustrated implementation, the storage controller 110 includes a latent multiplicity detection module 116 that is configured to generate a multiplicity bit mask 130 based on various incoming commands from the host 102. Specifically, in one implementation, the multiplicity detection module 116 transforms one or more commands coming from the host 102 into the multiplicity bit mask 130 using the technology disclosed herein. The multiplicity bit mask 130 may be stored in a system storage area of the storage media 120 or on the RAM 114 on the storage controller.

Specifically, when the host 102 sends a large number of random commands of various sizes, instead of saving them at many different places in the cache 112, the LIVID module 116 tracks them in a two-dimensional binary table referred to as the multiplicity bit mask (MBM) 130. Specifically, the LIVID module 116 keeps track of the last logical block address (LBA) of the incoming streams.

Initially, all entries in the Last LBA column 132 are set to "INVALID LBA." Furthermore, initially, all MBM bits 134 to zero ("0").

The MBM 130 is updated in response to incoming commands. The entries in the Last LBA column 132 are the last LBAs of various incoming streams from the host. Specifically, each row in the MBM 130 represents one stream coming from the host 102. Thus, row 1 142 tracks stream 1, row 2 144 tracks stream 2, row N 150 tracks stream N, etc. The use of the MBM 130 is further disclosed and discussed in detail in FIGS. 2-7.

FIG. 2 illustrates an MBM table 200 initialized at step 1 of the method disclosed herein. Specifically, for MBM 200 all entries in the Last LBA column 232 are set to "INVALID LBA." Furthermore, initially, all MBM bits 234 to zero ("0"). The MBM 200 may be used to keep track of up to N different streams, with each of the N streams having up to m different commands. Thus, if m were selected to be 1K, the MBM 200 may be able to keep track of up t0 1K commands.

Figure 3:
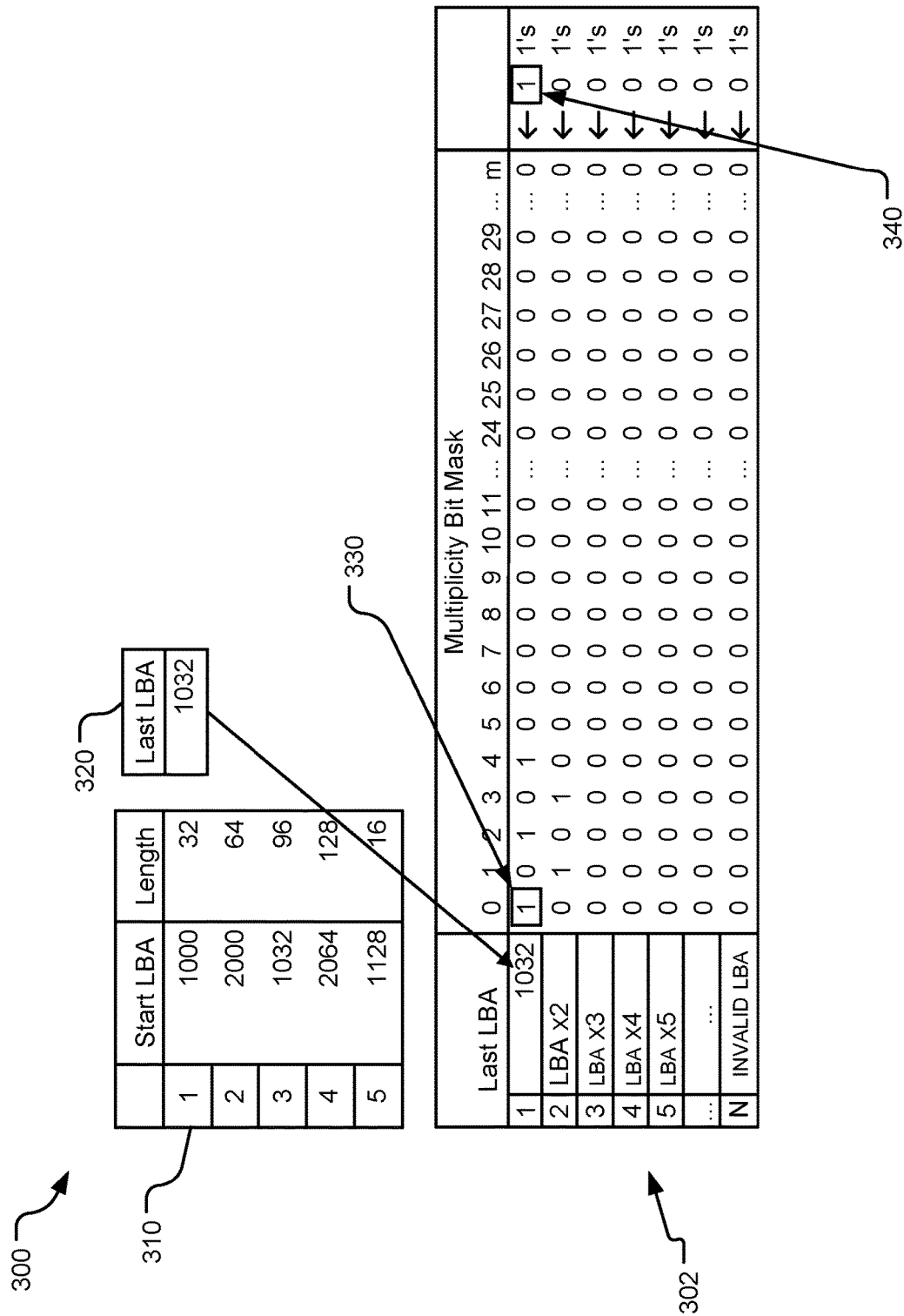
FIGS. 3-7 illustrate the MBM table at various stages during operation of the technology described herein.

FIG. 3 illustrates an MBM table 302 updated in response to receiving a command 310 with data for a first stream. Specifically, command 310 has 32 blocks of data starting from LBA 1000 and thus it goes up to LBA 1032. Therefore, the last LBA 320 for command 310 is 1032. As illustrated herein, in response to receiving command 310, the LIVID module 116 changes the Last LBA in row 1 (for stream 1) to 1032. It also changes the MBM 330 for stream 1 in row 1 for first command (column 0) to "1". Finally, the total number of commands 340 for stream 1 is updated to "1".

Figure 4:
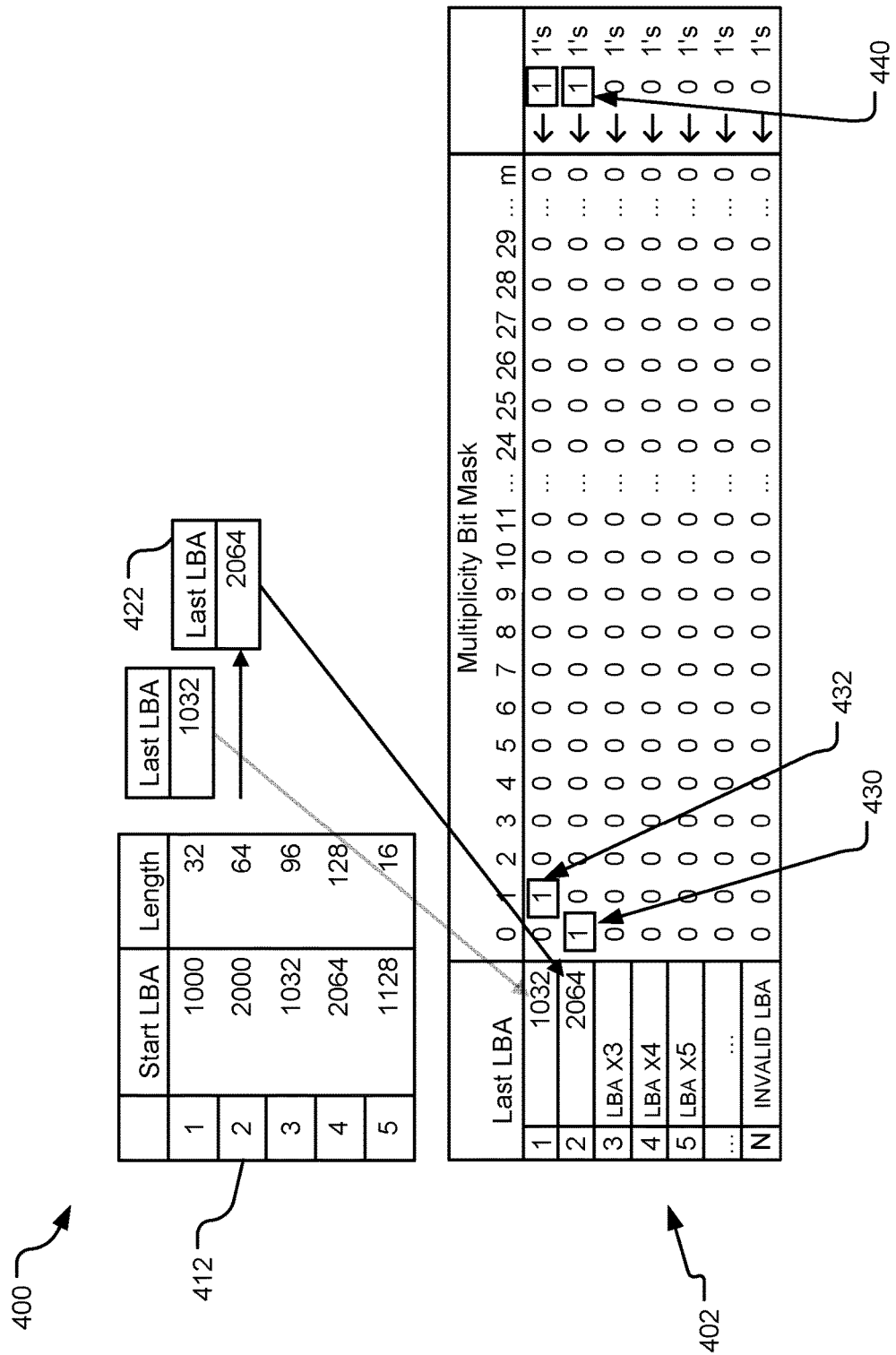

FIG. 4 illustrates an MBM table 402 updated in response to receiving a command 412 with data for a second stream. Specifically, command 412 has 64 blocks of data starting from LBA 2000 and thus it goes up to LBA 2064. Therefore, the last LBA 422 for command 310 is 2064. As illustrated herein, in response to receiving command 412, the LIVID module 116 changes the Last LBA in row 2 (for stream 2) to 2064. Furthermore, it also performs a rightShift to the MBM for stream 1 so that it is moved to MBM[2] 432. It also changes the MBM 430 for stream 2 in row 2 for second command (column 1) to "1". Finally, the total number of commands 440 for stream 2 is updated to "1".

Figure 5:
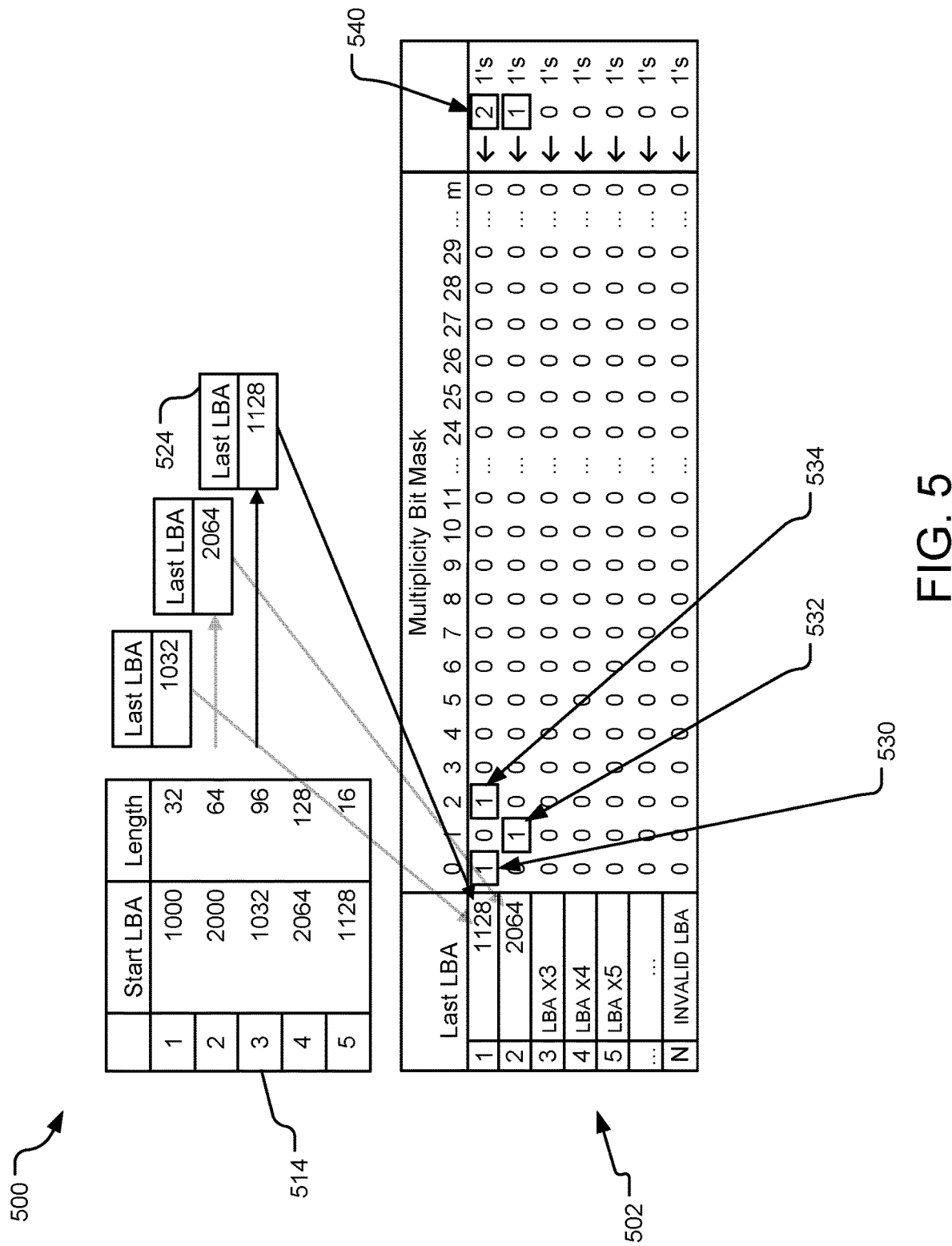

FIG. 5 illustrates an MBM table 502 updated in response to receiving a command 514 with data for the first stream. Specifically, command 514 has 96 blocks of data starting from LBA 1032 (at the end of the command 310) and thus it goes up to LBA 1128. Therefore, the last LBA 524 for command 514 is 1128. As illustrated herein, in response to receiving command 514, the LMD module 116 changes the Last LBA in row 1 (for stream 1) to 1128. Furthermore, it also performs a rightShift to the MBMs for streams 1 and 2 so that they are moved to MBM[2] 532, and MBM[3] 534. It also changes the MBM 530 for stream 1 in row 1 for third command (column 2) to "1". Finally, the total number of commands 540 for stream 1 is updated to "2" (specifically, commands 310 and 514).

Figure 6:
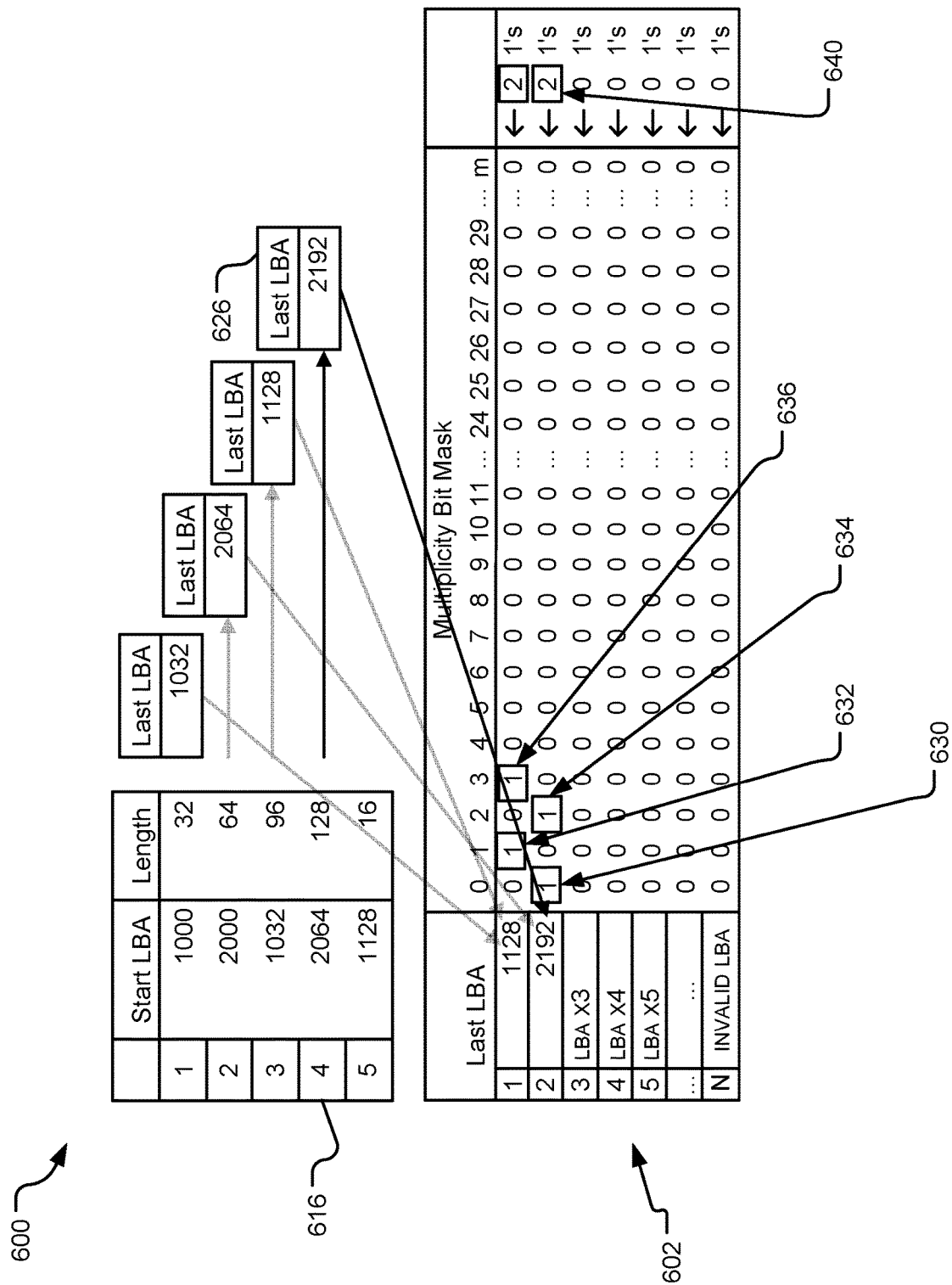

FIG. 6 illustrates an MBM table 602 updated in response to receiving a command 616 with data for the second stream. Specifically, command 616 has 128 blocks of data starting from LBA 2064 (at the end of the command 412) and thus it goes up to LBA 2192. Therefore, the last LBA 626 for command 616 is 2192. As illustrated herein, in response to receiving command 616, the LIVID module 116 changes the Last LBA in row 2 (for stream 2) to 2192. Furthermore, it also performs a rightShift to the MBMs for streams 1 and 2 so that they are moved to MBM[2] 632, MBM[3] 634, and MBM[4] 636. It also changes the MBM 630 for stream 2 in row 2 for fourth command (column 3) to "1". Finally, the total number of commands 640 for stream 2 is updated to "2" (specifically, commands 412 and 616).

Figure 7:
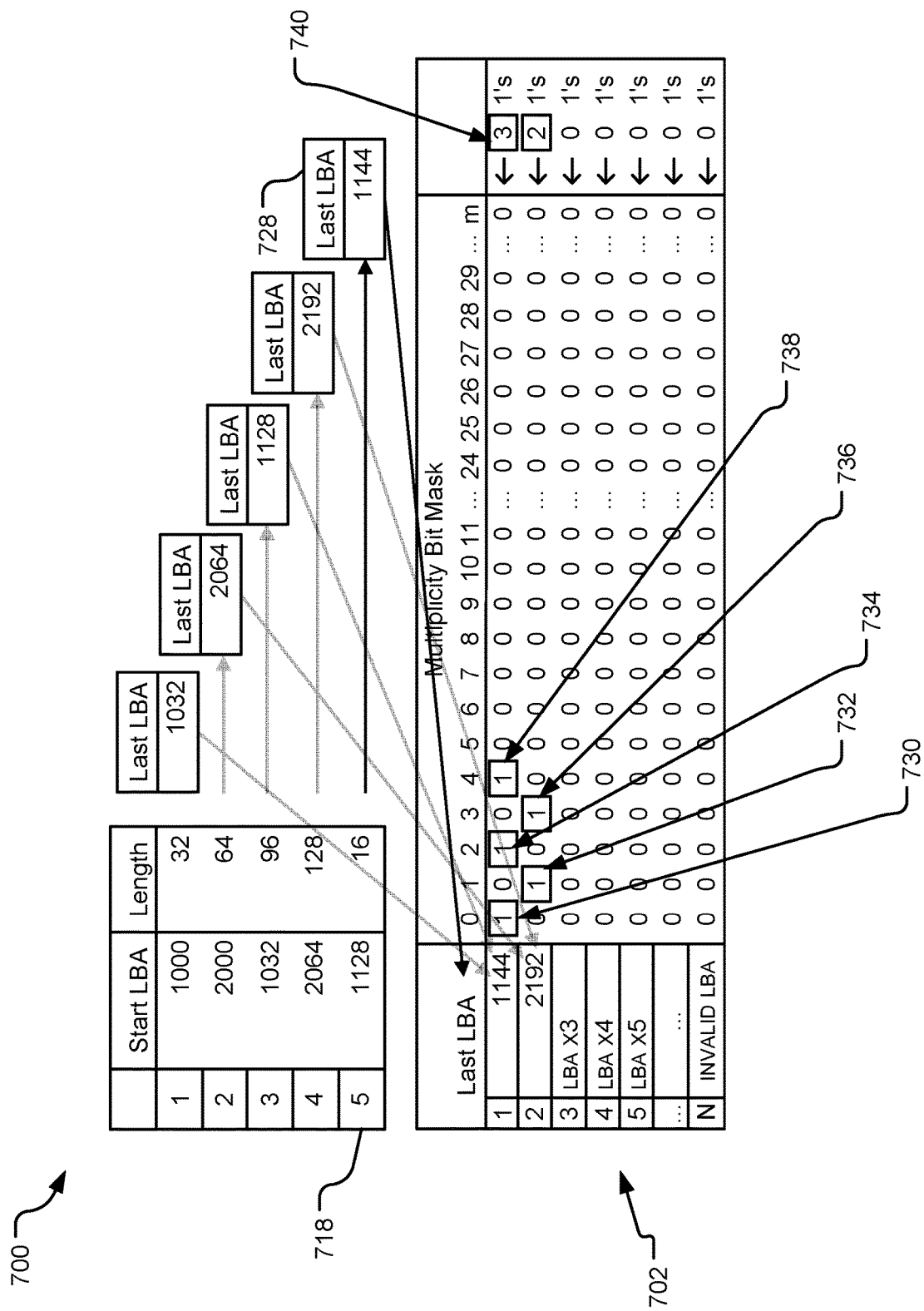

FIG. 7 illustrates an MBM table 702 updated in response to receiving a command 718 with data for the first stream. Specifically, command 718 has 16 blocks of data starting from LBA 1128 (at the end of the command 514) and thus it goes up to LBA 1144. Therefore, the last LBA 718 for command 718 is 1144. As illustrated herein, in response to receiving command 718, the LMD module 116 changes the Last LBA in row 1 (for stream 1) to 1144. Furthermore, it also performs a rightShift to the MBMs for streams 1 and 2 so that they are moved to MBM[2] 732, MBM[3] 734, MBM[4] 736, and MBM[5] 738. It also changes the MBM 730 for stream 1 in row 1 for fifth command (column 4) to "1". Finally, the total number of commands 740 for stream 1 is updated to "3" (specifically, commands 310, 514 and 718).

Figure 8:
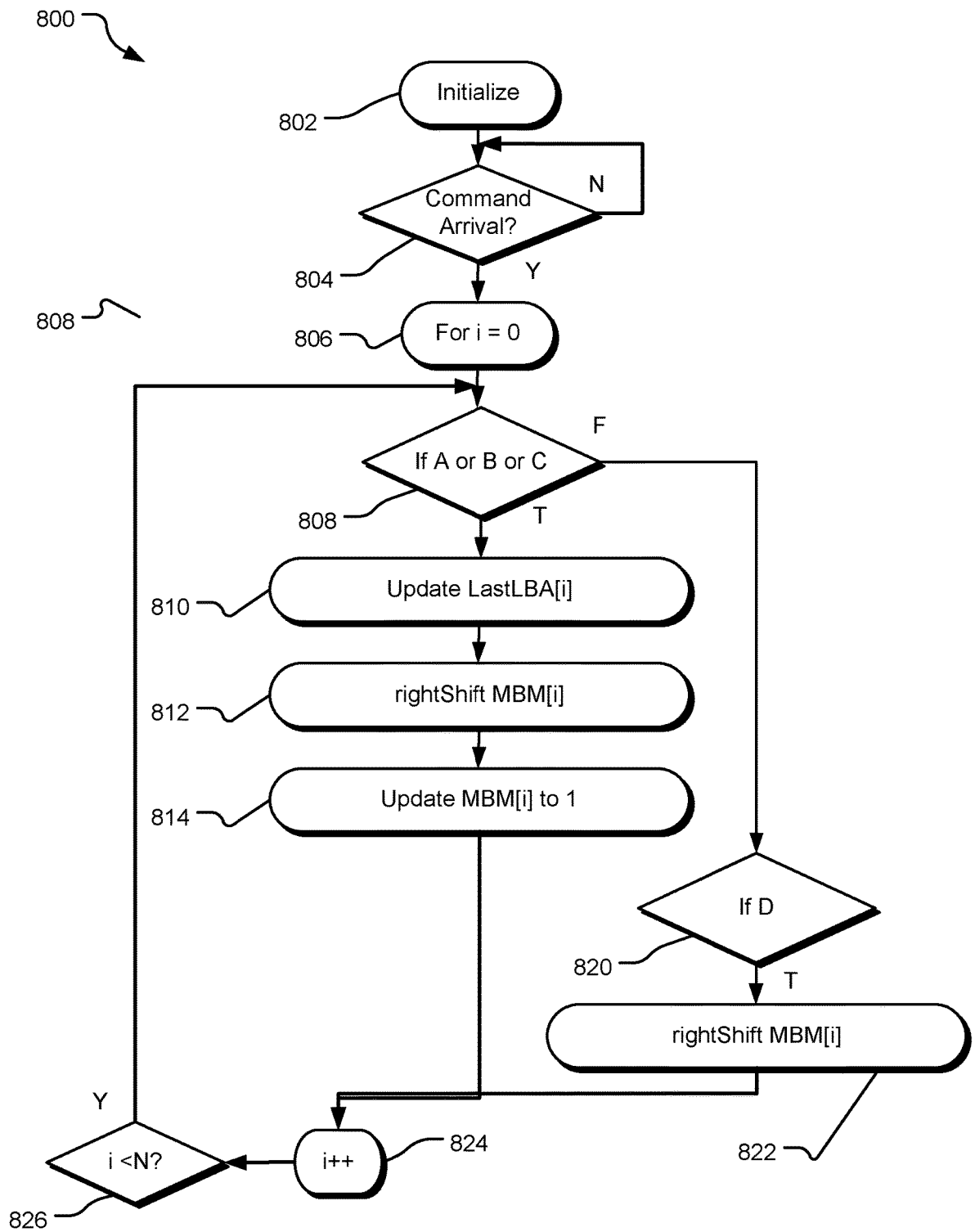
FIG. 8 illustrates an example flowchart for generating and updating a MBM as disclosed herein.

FIG. 8 illustrates a flowchart 800 for generating and updating a MBM as disclosed herein. An operation 802 initializes the MBM by setting values of all cells in the Last LBA column to "Invalid LBA" and setting values of all MBMs to zero. An operation 804 determines if a command from a host has arrived (with a starting LBA and the number of blocks). If so, an operation 806 initializes an index "i" for the number of streams to zero ("0"), wherein "i" is between "0" and N, the total number of streams. The operations of flowchart 800 re configurable to meet different workload including random commands. Two variables that can be used to meet different workloads are (a) the number of slots/streams N, which may be the number of streams+any additional slots to address random commands and (b) the width m of the MBM table, which indicates the number of commands for which the history is kept.

The operation 802 may also be implemented by the following:
  1. Let there be N times LastLBA variables
  2. Let there be N times MultipliticityBitMask, each contains m bits.
  3. Initialize all LastLBA to INVALID LBA.
  4. Initialize all MultiplicityBitMask to zeroes.

Subsequently, an operation 808 determines a series of conditions A, B, and C as provided below (specifically "A or B or C):
  A: LastLBA[i]=invalid LBA
  B: MBM[i]=zero ("0")
  C: LastLBA[i]=startLBA If the outcome of the evaluation 808 is true ("T"), an operation 810 updates the LastLBA[i].

Subsequently an operation 812 right shifts MBM[i] and an operation 814 updates MBM[i] to 1.

If the outcome of the evaluation at 808 is false ("F"), an operation 820 evaluates if condition D (D: MBM[i] is not zero ("0")) is met. If so, an operation 822 right shifts MBM[i].

Subsequently, an operation 824 increases the value of the index "i" and an operation 830 determines if "i" is less than "N." If so, control is transferred to operation 808.

The pseudocode for the operations of FIG. 8 may be given as follows:

```
for index = 0; index < N; index++;
    If LastLBA[index] is INVALID LBA or
    MultiplicityBitMask[index] is zero or
    LastLBA[index] == StartLba, then
        Update LastLBA[index] to StartLba + TransferLength
        Right shift MultiplicityBitMask[index]
        Set bit 0 of the MultiplicityBitMask[index] to 1
    Else if ( MultiplicityBitMask[index] is not zero, then
        Right shift MultiplicityBitMask[index]
```

In an alternative implementation, the operations of FIG. 8 may be enhanced by adding a sticky bit to indicate that particular slot has higher score and thus reflecting true stream. As such, other slots can be relieved earlier to deal with the random commands. Thus the number of slots N can be further minimized. Alternatively, the operations of FIG. 8 may be enhanced by adding a time warp such that instead of keeping m bits in the MBM, a number of bits can be OR-ed together and be represented as a single bit. Thus, bits 16 onwards can be compressed with a single bit to represent 8 bits.

Figure 9:
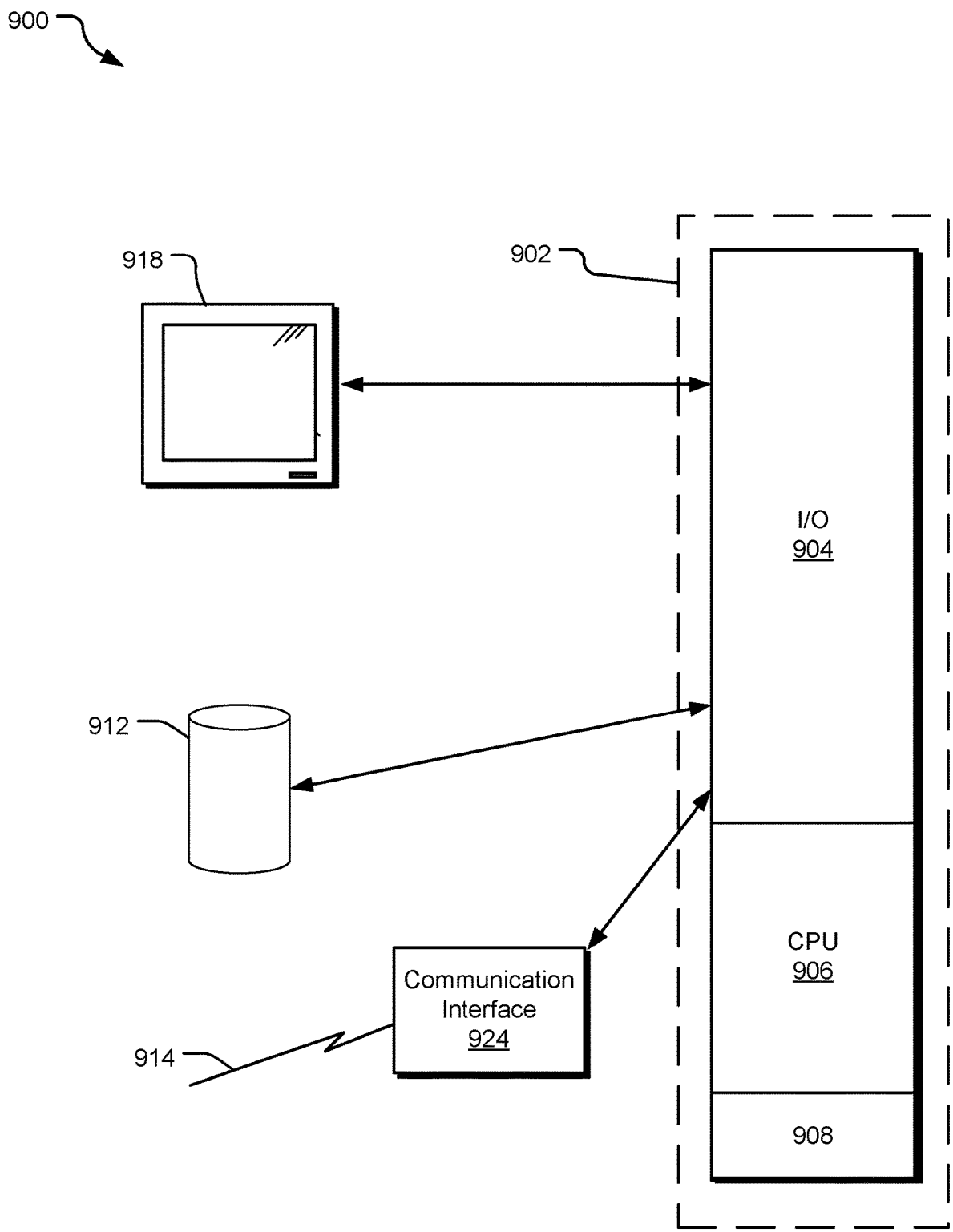
FIG. 9 illustrates an example processing system that may be useful in implementing the technology described herein.

FIG. 9 illustrates an example processing system 900 that may be useful in implementing the described technology. The processing system 900 is capable of executing a computer program product embodied in a tangible computer-readable storage medium to execute a computer process. Data and program files may be input to the processing system 900, which reads the files and executes the programs therein using one or more processors (e.g., CPUs, GPUs, ASICs). Some of the elements of a processing system 900 are shown in FIG. 9 wherein a processor 902 is shown having an input/output (I/O) section 904, a Central Processing Unit (CPU) 906, and a memory section 908. There may be one or more processors 902, such that the processor 902 of the processing system 900 comprises a single central-processing unit 906, or a plurality of processing units. The processors may be single core or multi-core processors. The processing system 900 may be a conventional computer, a distributed computer, or any other type of computer. The described technology is optionally implemented in software loaded in memory 908, a storage unit 912, and/or communicated via a wired or wireless network link 914 on a carrier signal (e.g., Ethernet, 3G wireless, 5G wireless, LTE (Long Term Evolution)) thereby transforming the processing system 900 in FIG. 9 to a special purpose machine for implementing the described operations. The processing system 900 may be an application specific processing system configured for supporting the disc drive throughput balancing system disclosed herein.

The I/O section 904 may be connected to one or more user-interface devices (e.g., a keyboard, a touch-screen display unit 918, etc.) or a storage unit 912. Computer program products containing mechanisms to effectuate the systems and methods in accordance with the described technology may reside in the memory section 908 or on the storage unit 912 of such a system 900.

A communication interface 924 is capable of connecting the processing system 900 to an enterprise network via the network link 914, through which the computer system can receive instructions and data embodied in a carrier wave. When used in a local area networking (LAN) environment, the processing system 900 is connected (by wired connection or wirelessly) to a local network through the communication interface 924, which is one type of communications device. When used in a wide-area-networking (WAN) environment, the processing system 900 typically includes a modem, a network adapter, or any other type of communications device for establishing communications over the wide area network. In a networked environment, program modules depicted relative to the processing system 900 or portions thereof, may be stored in a remote memory storage device. It is appreciated that the network connections shown are examples of communications devices for and other means of establishing a communications link between the computers may be used.

In an example implementation, a storage controller, and other modules may be embodied by instructions stored in memory 908 and/or the storage unit 912 and executed by the processor 902. Further, the storage controller may be configured to assist in supporting the RAID0 implementation. A RAID storage may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 908 and/or the storage unit 912 and executed by the processor 902.

The processing system 900 may be implemented in a device, such as a user device, storage device, IoT device, a desktop, laptop, computing device. The processing system 900 may be a storage device that executes in a user device or external to a user device.

In addition to methods, the embodiments of the technology described herein can be implemented as logical steps in one or more computer systems. The logical operations of the present technology can be implemented (1) as a sequence of processor-implemented steps executing in one or more computer systems and/or (2) as interconnected machine or circuit modules within one or more computer systems. Implementation is a matter of choice, dependent on the performance requirements of the computer system implementing the technology. Accordingly, the logical operations of the technology described herein are referred to variously as operations, steps, objects, or modules. Furthermore, it should be understood that logical operations may be performed in any order, unless explicitly claimed otherwise or unless a specific order is inherently necessitated by the claim language.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. An apparatus comprising:
   a storage media; and
   a storage controller configured to:
   receive a command from a host, the command providing a starting logical block address (LBA) and a length of the command,
   generate a multiplicity bit mask (MBM) for the command in response to receiving a command from a host, the MBM indicating presence of the command for a stream, and
   store the MBM to an MBM table in a row corresponding to the stream that the command is part of, the MBM table having a Last LBA column listing last LBAs of various commands in a row corresponding the stream.

2. The apparatus of claim 1, wherein the storage controller is further configured to initialize the MBM table with each MBM set to zero and each entry in the Last LBA column set to "invalidLBA."

3. The apparatus of claim 2, wherein the storage controller is further configured to update the MBM table to store the number of commands per stream.

4. The apparatus of claim 2, wherein the storage controller is further configured to evaluate ["last LBA is invalid LBA" OR "MBB for a given command is zero" OR "lastLBA for a given command is a startLBA"] and in response to determining that ["last LBA is invalid LBA" OR "MBB for a given command is zero" OR "lastLBA for a given command is a startLBA"] is true update the lastLBA value in the MBM table with a lastLBA value of the given command.

5. The apparatus of claim 4, wherein the storage controller is further configured to right shift the MBM for the given command stream and change the value of the current MBM to 1.

6. The apparatus of claim 4, wherein the storage controller is further configured to evaluate ["last LBA is invalid LBA" OR "MBB for a given command is zero" OR "lastLBA for a given command is a startLBA"] and in response to determining that ["last LBA is invalid LBA" OR "MBB for a given command is zero" OR "lastLBA for a given command is a startLBA"] is false right shifting the MBM for the given stream.

7. The apparatus of claim 4, wherein the incoming commands are at least one of data transfer command and metadata command.

8. The apparatus of claim 7, wherein the storage controller is further configured to make no change to the MBM table if the command is a metadata command.

9. A method comprising:
   receiving a command from a host, the command providing a starting logical block address (LBA) and a length of the command,
   generating a multiplicity bit mask (MBM) for the command in response to receiving a command from a host, the MBM indicating presence of the command for a stream, and
   storing the MBM to an MBM table in a row corresponding to a stream that the command is part of, the MBM table having a Last LBA column listing last LBAs of various commands in a row corresponding the stream.

10. The method of claim 9, further comprising initializing the MBM table with each MBM set to zero and each entry in the Last LBA column set to "invalidLBA."

11. The method of claim 10, further comprising updating the MBM table to store the number of commands per stream.

12. The method of claim 10, further comprising evaluating ["last LBA is invalid LBA" OR "MBB for a given command is zero" OR "lastLBA for a given command is a startLBA"] and in response to determining that ["last LBA is invalid LBA" OR "MBB for a given command is zero" OR "lastLBA for a given command is a startLBA"] is true updating the lastLBA value in the MBM table with a lastLBA value of the given command.

13. The method of claim 12, further comprising right shifting the MBM for the given command stream and change the value of the current MBM to 1.

14. The method of claim 10, further comprising evaluating ["last LBA is invalid LBA" OR "MBB for a given command is zero" OR "lastLBA for a given command is a startLBA"]; and in response to determining that ["last LBA is invalid LBA" OR "MBB for a given command is zero" OR "lastLBA for a given command is a startLBA"] is false right shifting the MBM for the given stream.

15. The method of claim 10, wherein the incoming commands are at least one of data transfer command and metadata command.

16. The method of claim 15, further comprising making no change to the MBM table if the command is a metadata command.

17. A storage device controller configured to:
   receive a command from a host, the command providing a starting logical block address (LBA) and a length of the command,
   generate a multiplicity bit mask (MBM) for the command in response to receiving a command from a host, the MBM indicating presence of the command for a stream, and
   store the MBM to an MBM table in a row corresponding to the stream that the command is part of, the MBM table having a Last LBA column listing last LBAs of various commands in a row corresponding the stream.

18. The storage device controller of claim 17, further configured to initialize the MBM table with each MBM set to zero and each entry in the Last LBA column set to "invalidLBA."

19. The storage device controller of claim 18, further configured to update the MBM table to store the number of commands per stream.

20. The storage device controller of claim 18, further configured to evaluate ["last LBA is invalid LBA" OR "MBB for a given command is zero" OR "lastLBA for a given command is a startLBA"] and in response to determining that ["last LBA is invalid LBA" OR "MBB for a given command is zero" OR "lastLBA for a given command is a startLBA"] is true updating the lastLBA value in the MBM table with a lastLBA value of the given command.

* * * * *